United States Patent
Hartel

[15] 3,652,040
[45] Mar. 28, 1972

[54] LANDING GEAR SHOCK STRUT

[72] Inventor: Erwin H. Hartel, Brunswick, Ohio

[73] Assignee: The Cleveland Pneumatic Tool Company, Cleveland, Ohio

[22] Filed: June 10, 1970

[21] Appl. No.: 48,833

Related U.S. Application Data

[63] Continuation of Ser. No. 729,954, May 17, 1968, abandoned.

[52] U.S. Cl. ..........................................244/104 R, 177/141
[51] Int. Cl. ......................................................B64c 25/58
[58] Field of Search.................244/104, 50, 103 R; 177/141

[56] References Cited

UNITED STATES PATENTS 2,687,857    8/1954    Caldwell et al. .........................244/50

Primary Examiner—Milton Buchler
Assistant Examiner—Paul E. Sauberer
Attorney—Oberlin, Maky, Donnelly and Renner

[57] ABSTRACT

The wheel-supporting piston of the strut is rotated relative to the cylinder by an adjustable torque arm interconnection of the two to eliminate vertical friction, the adjustment being made by a hydraulic actuator, and a pressure readout of the internal strut pressure provides indication of the vertical weight load on the gear after such friction elimination.

9 Claims, 3 Drawing Figures

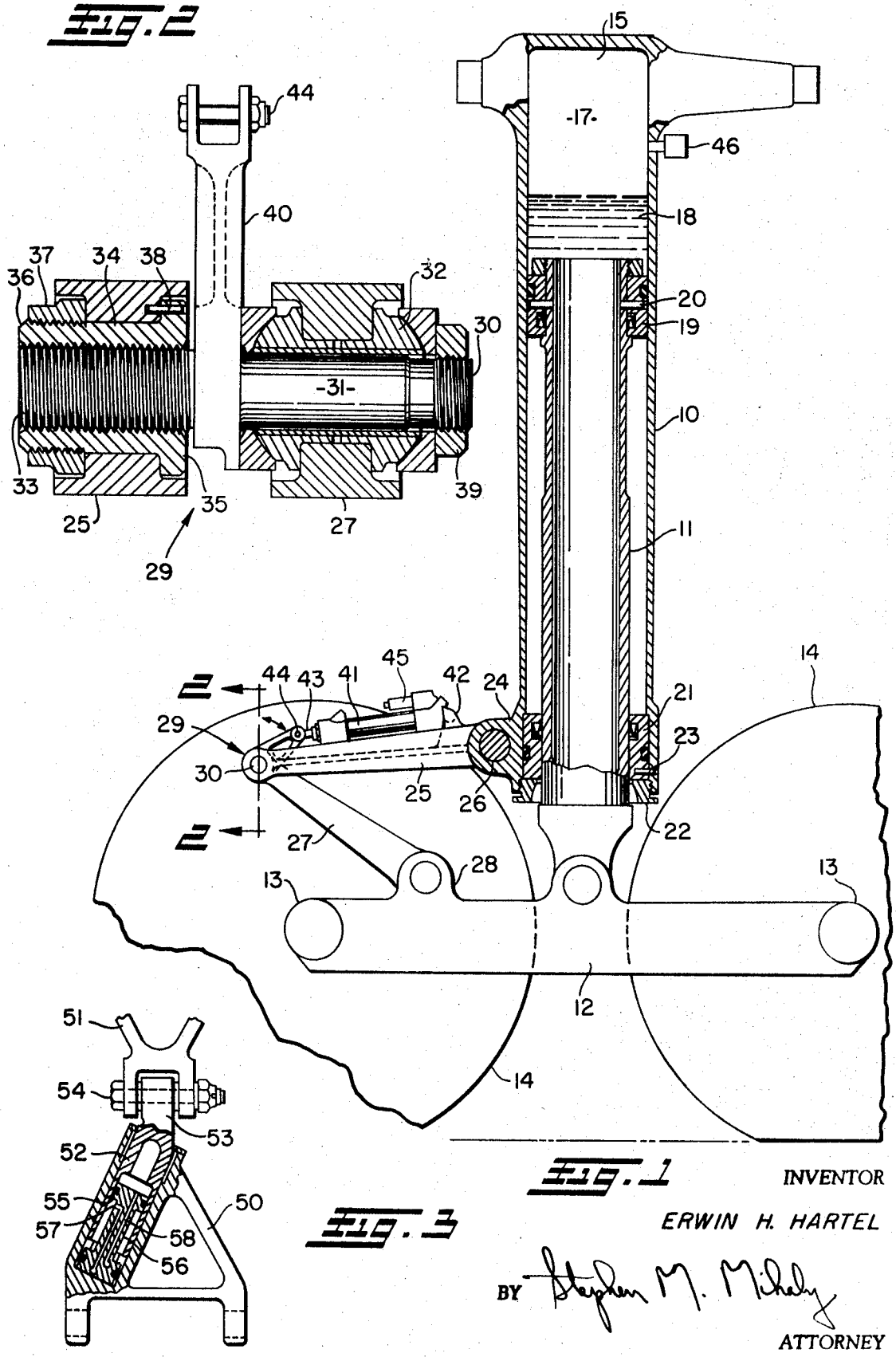

LANDING GEAR SHOCK STRUT

This application is a continuation of application, Ser. No. 729,954, filed on May 17, 1968, now abandoned.

This invention relates to aircraft shock struts and has for its principal object the provision of a main gear strut having a powered adjustment in its ground support condition which eliminates vertical friction in the assembly.

The elimination of friction is particularly desired to permit accurate measurement of the weight load on the strut as a function of the fluid pressure in the same, with such calibration not heretofore feasible and other more complicated and expensive approaches having been taken to equip aircraft with weighing systems.

The problem in conventional gear can be illustrated by assuming that an aircraft to be loaded is taxied into position and that this entails a sharp turn as the last maneuver. The two main landing gears will very likely now have a set relative to each other due to the scraping action of the tires, and this set can cause a spreading force between the two gears with consequent side loading of the shock strut bearings. Such side or transverse loading of the bearings produces a vertical force differential between the shock cylinder and piston.

As the aircraft is loaded, the internal strut pressure becomes insufficient to support the load and the piston is influenced to slide into the cylinder for an equalizing increase in the pressure. This action of course requires the piston to slide relative to the cylinder at the bearing surfaces, the transverse load acting at the latter is included in the balancing and, accordingly, the internal pressure is not accurately responsive to the vertical load on the strut.

The present invention has solved this problem by, briefly, inducing relative rotation of the cylinder and piston thereby eliminating such vertical frictional forces acting on the bearing surfaces. More particularly, the rotation causes the frictional force to assume horizontal and vertical vectors and, the latter being considerably smaller, the piston will move into the cylinder to increase the pressure in this case to balance only the vertical weight load on the strut and the relatively reduced vertical component of the transverse loading of the bearings. By relatively oscillating the cylinder and piston, a condition can be reached in which the internal pressure balances all the external load and the external reaction can therefore accurately be measured in terms of this internal pressure.

The invention also provides particular actuating mechanism for effecting such adjustment of the strut in positive controlled manner.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

FIG. 1 is a longitudinal section of a shock strut in accordance with the present invention;

FIG. 2 is a cross-sectional view of an enlarged scale of that part of the assembly at the plane of line 2—2 in FIG. 1; and FIG. 3 is a fragmented partially sectioned view of a modified actuator for adjusting the strut.

The strut shown in the drawing is generally of known configuration for aircraft main landing gear and comprises a cylinder 10 as the main suspension leg to be attached to the airframe and a piston 11 slidable in sealed relation to the cylinder and carrying a pivoted bogie frame 12. The latter supports axles 13 on which the wheels, such as shown at 14, are mounted.

The upper end of the cylinder above the piston forms a chamber 15 therewith containing air 17 over oil 18 at a predetermined internal pressure and, as will become clearly apparent, it is significant to the present invention only that the strut basically comprises such cylinder, piston, and fluid spring as a general combination.

The piston carries an upper bearing 19 in sliding engagement with the cylinder, and this bearing is locked against rotation by a pin 20. The sliding support of the piston is completed by a lower bearing 21 held in the end of the cylinder by a bearing retainer 22 and rotatably locked to the cylinder by a further lock pin 23.

The cylinder 10 has an external lug 24 at its lower end to which an upper torque arm 25 is connected by a horizontal pivot 26. A cooperable lower torque arm 27 is pivoted on the bogie frame 12, at lug 28 on the same, and the free ends of the two arms are interconnected by an adjustable pivot assembly in FIGS. 1 and 2 designated generally by reference numeral 29.

This pivot assembly comprises an apex bolt 30 having an unthreaded end length 31 supported by a self-aligning bearing 32 in the end of the lower torque arm 27 and the opposite end section 33 of the bolt is threaded in a sleeve 34 extending through the end of the upper torque arm 25. Sleeve 34 is flanged at one end 35 and externally threaded at the other 36, with a nut 37 on the latter holding the sleeve in the arm 25 and a pin 38 extending through the flange into the arm locking the sleeve against rotation. The end of the apex bolt projecting from the lower torque arm 27 is threaded and receives a mounting nut 39.

The ends of the two arms 25, 27 thus interconnected by the apex bolt 30 are normally separated as shown and a lever 40 integral with the bolt is positioned in the intervening space. A double-acting hydraulic actuator 41 is mounted on the upper torque arm by an end pivot 42 and comprises a position rod extension 43 at the other end to which the lever is connected by a pivot 44. It is also preferred that the actuator be provided with a cycling valve 45.

It will be evident that actuation of the lever 40 rotates the apex bolt 30 relative to the locked thread sleeve 34 in the end of the upper torque arm and thereby displaces the same relative to the connected end of the lower torque arm. Such displacement produces rotation of the bogie frame 12 and hence the piston 11 and upper bearing 19 relative to the stationary cylinder and lower bearing, with the rotation occurring between the upper bearing and the cylinder inside diameter and between the lower bearing inside diameter and the piston outside diameter. The bearing surfaces are relieved in this manner of frictional vertical forces that may be acting on the same.

As explained in the foregoing, it is preferred that the adjustment be oscillatory, and this action can readily be realized with the cycling valve 45 operating to control the actuator.

The adjustment of the strut by the actuator is remotely controlled from a suitable station, and the upper end of the cylinder is provided with a pressure responsive instrument 46 to measure the air pressure therein and indicate the pressure at the same station. When a weight check is to be made, the actuator is cyclically powered and the operator will observe a gradual settling of the weight indication to a value which will be held although the actuator continues to cycle, with this value being the weight reading. Both main gear of the aircraft will be equipped as described above, and the nose gear requires only the addition of an added control valve for its steering unit and of course a pressure responsive device. Steering of the nose gear entails relative rotation of the cylinder and piston in the same, and the added valve provides actuation coincident with the adjustment of the main gear.

The modification shown in FIG. 3 comprises first and second sectors 50, 51 for respective pivotal attachment to the upper and lower torque arms. The sector 50 is provided with an adjustable arm 52 having a lug end 53 at an angle which is pivotally connected to the end of the other sector by a bolt 54.

The main extent of the arm 52 is formed as a hollow cylinder in sealed sliding engagement with a stationary piston 55, and the piston rod 56 carries fluid passages 57, 58 respectively communicating with the inner chambers of the arm at respective sides of the piston. The arm 52 can, accordingly, be hydraulically reciprocated, and it will be seen that the angular relation of the force on the pivot connection 54 to the sector 51 will cause displacement of the latter and hence the desired rotation of the shock strut piston.

Other forms of actuators, if sufficiently rugged, might equally be adaptable to such use, with the manner of operating the same as described in the above and thus preferably including an appropriate cyclic control action.

I claim:

1. In an aircraft landing gear including a cylinder, a wheel-supporting piston movable in the cylinder, bearing means between the cylinder and piston for supporting and guiding the latter in its such movement, seal means sealing the cylinder and piston, and an air-oil spring in the cylinder, the improvement comprising power means for producing relative movement of the cylinder and piston with aircraft weight load imposed on the gear, thereby to eliminate frictional force developed by the bearing means and seal means, and pressure sensitive means for measuring and indicating fluid pressure within the air-oil spring after such relative movement of the cylinder and piston to provide an indication of the vertical weight load on the gear free of such frictional force.

2. A landing gear as set forth in claim 1, wherein the power means produces oscillatory relative movement of the cylinder and piston.

3. A landing gear as set forth in claim 1, wherein the power means produces relative rotation of the cylinder and piston.

4. A landing gear as set forth in claim 1, wherein the power means produces oscillatory relative rotation of the cylinder and piston.

5. A landing gear as set forth in claim 1, wherein the power means includes first and second arms having corresponding ends respectively pivotally connected to the cylinder and piston, and means for causing relative angular displacement of said arms to produce relative rotation of the cylinder and piston.

6. A landing gear as set forth in claim 5, wherein the first and second arms are torque arms the free ends of which are interconnected by pivot means, and the thus interconnected ends are laterally displaced relatively to produce the relative rotation of the cylinder and piston.

7. A landing gear as set forth in claim 5, wherein the means for causing relative angular displacement of said arms includes a double-acting hydraulic actuator, the relative rotation of the cylinder and piston thereby being oscillatory.

8. The method of weighing an aircraft by measuring vertical load on its landing gear, each including a cylinder and piston and an air-oil spring therebetween, which comprises the steps of causing short stroke relative movement of each cylinder and piston with the aircraft on the ground in the loaded condition to be weighed, with such relative movement effective to substantially eliminate vertical friction in the gear, and measuring the spring fluid pressure in the gear after such relative movement.

9. The method set forth in claim 8, wherein the relative movement is rotary and oscillatory.

* * * * *